(12) United States Patent
Jin

(10) Patent No.: US 6,799,768 B2
(45) Date of Patent: Oct. 5, 2004

(54) VEHICULAR ROLL STABILIZER

(75) Inventor: Byung-Woon Jin, Chonrabuk-do (KR)

(73) Assignee: Hyundai Motor Company, Seoul (KR)

( * ) Notice: Subject to any disclaimer, the term of this patent is extended or adjusted under 35 U.S.C. 154(b) by 70 days.

(21) Appl. No.: 10/273,619

(22) Filed: Oct. 18, 2002

(65) Prior Publication Data

US 2003/0075883 A1 Apr. 24, 2003

(30) Foreign Application Priority Data

Oct. 19, 2001 (KR) ........................................ 2001-64626

(51) Int. Cl.$^7$ ............................................. B60G 17/01
(52) U.S. Cl. ................................ 280/5.508; 280/124.16
(58) Field of Search ........................ 280/5.508, 5.509, 280/6.15, 124.16, DIG. 1; 137/625.21, 625.46, 270; 251/208

(56) References Cited

U.S. PATENT DOCUMENTS

| | | | |
|---|---|---|---|
| 2,784,978 A | * | 3/1957 | Seale ........................ 280/6.16 |
| 3,065,976 A | * | 11/1962 | Vogel ....................... 280/5.503 |
| 3,104,114 A | * | 9/1963 | Vogel ....................... 280/5.508 |
| 3,556,542 A | * | 1/1971 | Rene ........................ 280/6.16 |
| 4,722,548 A | | 2/1988 | Hamilton et al. ........... 280/707 |
| 4,971,360 A | | 11/1990 | Pischke et al. ............. 280/840 |
| 5,042,784 A | | 8/1991 | Murai et al. ................ 267/136 |
| 5,071,159 A | | 12/1991 | Kamimura et al. ......... 280/707 |
| 5,513,108 A | | 4/1996 | Kishimoto et al. ..... 364/424.05 |
| 5,651,555 A | * | 7/1997 | O'Reilly et al. ......... 280/6.158 |
| 5,725,239 A | | 3/1998 | de Molina .................. 280/711 |
| 5,947,031 A | | 9/1999 | Polley ........................ 105/453 |
| 6,029,764 A | | 2/2000 | Schubert .................. 180/89.13 |
| 6,070,681 A | | 6/2000 | Catanzarite et al. ...... 180/89.15 |
| 6,164,665 A | | 12/2000 | Lentz et al. ............. 280/5.503 |
| 6,669,217 B2 | * | 12/2003 | Sorum et al. .......... 280/124.16 |

FOREIGN PATENT DOCUMENTS

JP 2001213129 A * 8/2001 ......... B60G/17/015

* cited by examiner

Primary Examiner—David R. Dunn
(74) Attorney, Agent, or Firm—Morgan Lewis & Bockius LLP

(57) ABSTRACT

A vehicular roll stabilizer used in a vehicle with an air suspension system, comprises roll sensing valve units traversely and centrally mounted on a vehicular body for receiving compressed air from an air tank to adjust the state of the compressed air respectively supplied to left and right air springs. Left and right roll sensing rods connect the roll sensing valve and axles, such that air inside the air springs can be directly controlled without using leveling valves and without enlarging the size of the stabilizer to actively obtain good resistance to rolling, thereby improving the performance of the vehicle.

2 Claims, 7 Drawing Sheets

VEHICULAR ROLL STABILIZER

FIELD OF THE INVENTION

The present invention relates to a vehicular roll stabilizer adapted with an air suspension.

BACKGROUND OF THE INVENTION

In a vehicle equipped with a conventional air suspension, a stabilizer bar is used as a means to restrict the rolling when the vehicle makes a turn. The diameter of the stabilizer bar is controlled to adjust the roll strength. However, as the diameter of the stabilizer bar is increased, there occurs a limitation on increasing the size of the parts for mounting the stabilizer bar to the vehicular body, thereby hindering the improvement of vehicular performance.

In addition, a leveling valve in an air suspension-mounted vehicle releases a small amount of air into an air spring and discharges same from the air spring to help restrict the rolling. However in case of the front suspension, only one leveling valve is typically installed which is not effective in suppressing the rolling.

SUMMARY OF THE INVENTION

The present invention provides a vehicular roll stabilizer of an air suspension-mounted vehicle adapted to directly control the air inside an air spring without using a leveling valve and to obtain an improved resistance to rolling without enlarging the size of the stabilizer, thereby greatly improving the performance of the vehicle.

In accordance with a preferred embodiment of the present invention, a vehicular roll stabilizer comprises a roll sensing valve traversely and centrally mounted on a vehicular body for receiving compressed air from an air tank to adjust the compressed air respectively supplied to the left and right air springs. Also, left and right roll sensing rods are provided for connecting the roll sensing valve means and axles.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Hereinafter, the preferred embodiment of the present invention will be described in detail with reference to the accompanying drawings.

Figure 1:
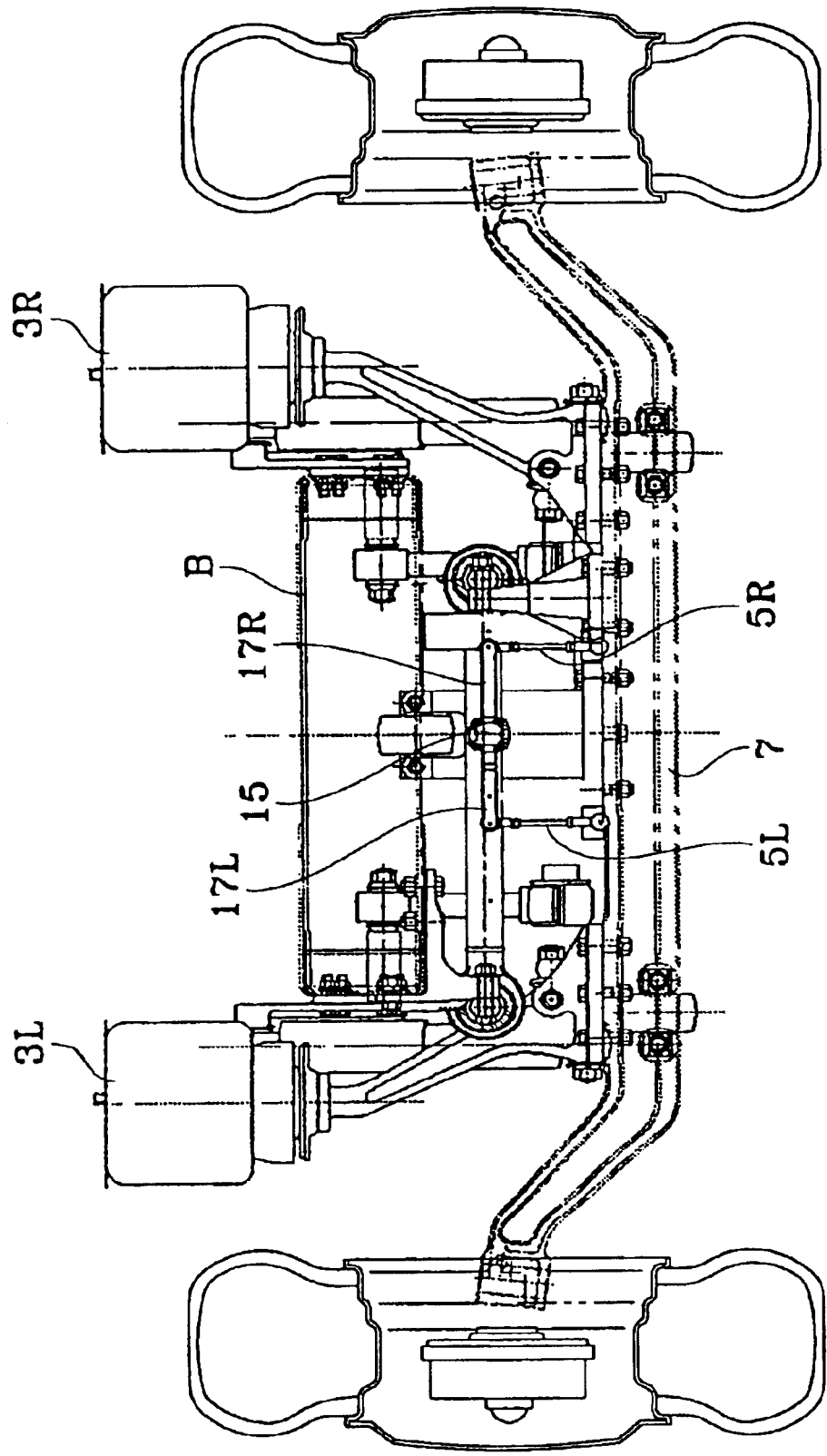
FIG. 1 is a schematic structural drawing illustrating a stabilizer in an air suspension-mounted vehicle according to the present invention.
Figure 7:
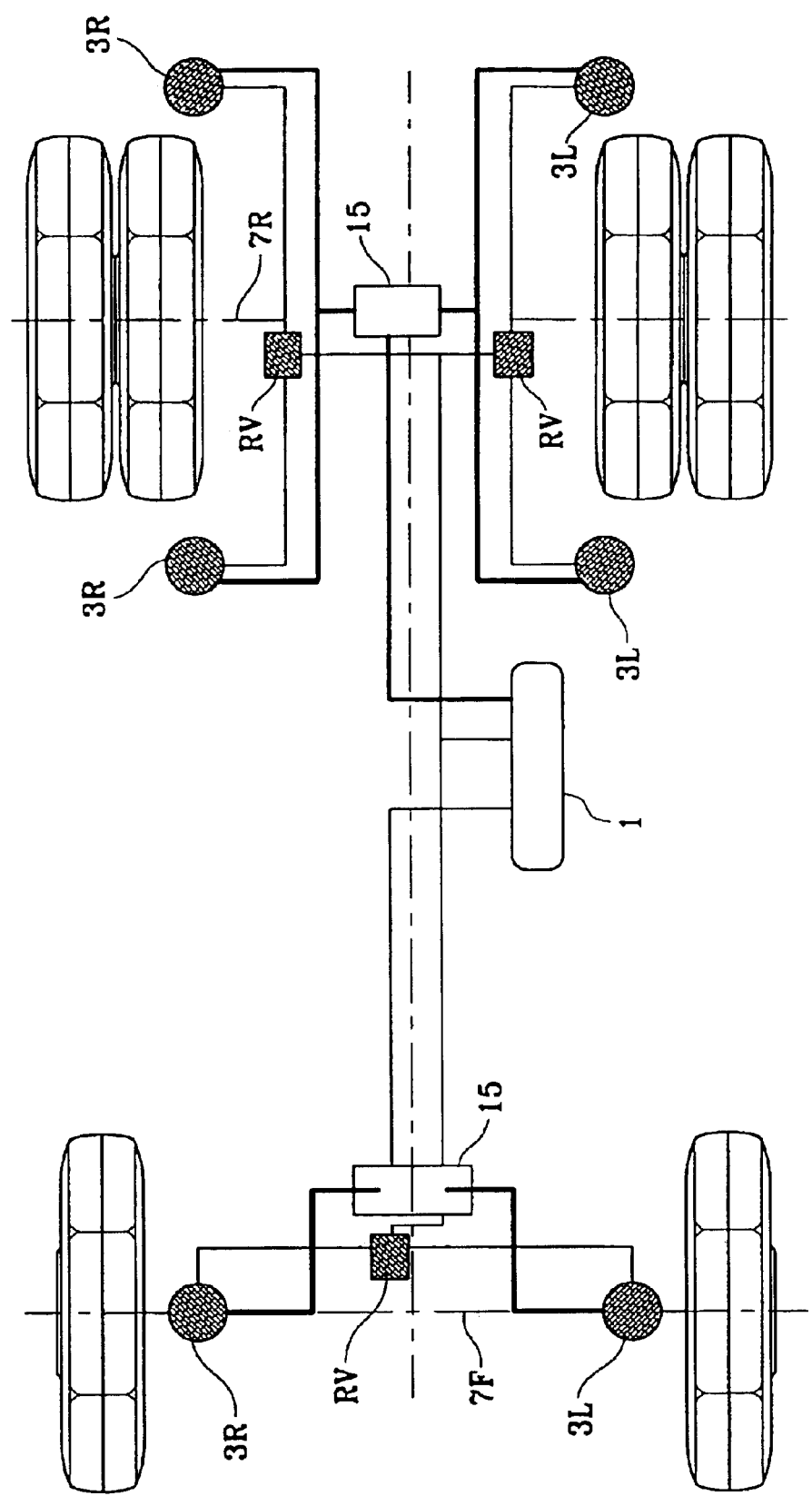
FIG. 7 is a schematic drawing illustrating a stabilizer mounted on a vehicle according to the present invention.

As shown in FIGS. 1 and 7, a roll sensing valve means 15 is traversely and centrally mounted on a vehicular body (B) for receiving compressed air from an air tank 1 to adjust the compressed air respectively supplied to the left and right air springs 3L and 3R. The roll sensing valve means is connected to axles (7:7F and 7R) via left and right roll sensing rods 5L and 5R. A pipe passage is provided, apart from the conventional leveling valve (RV), for supplying and controlling the air in the left and right air springs 3L and 3R.

Figure 2:
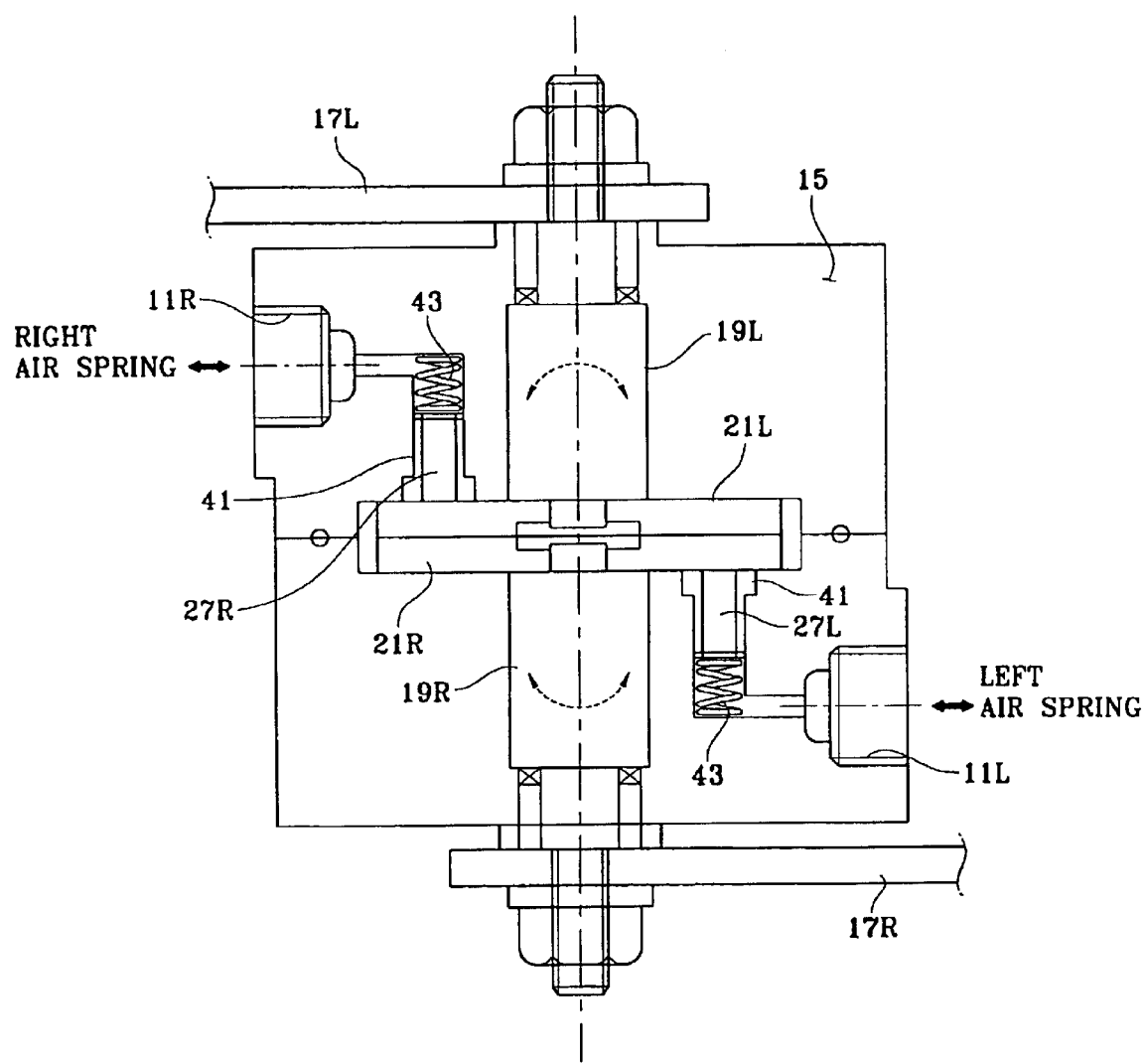
FIGS. 2 and 3 are schematic structural drawings illustrating a structure of roll sensing valve means at the stabilizer in FIG. 1.
Figure 3:
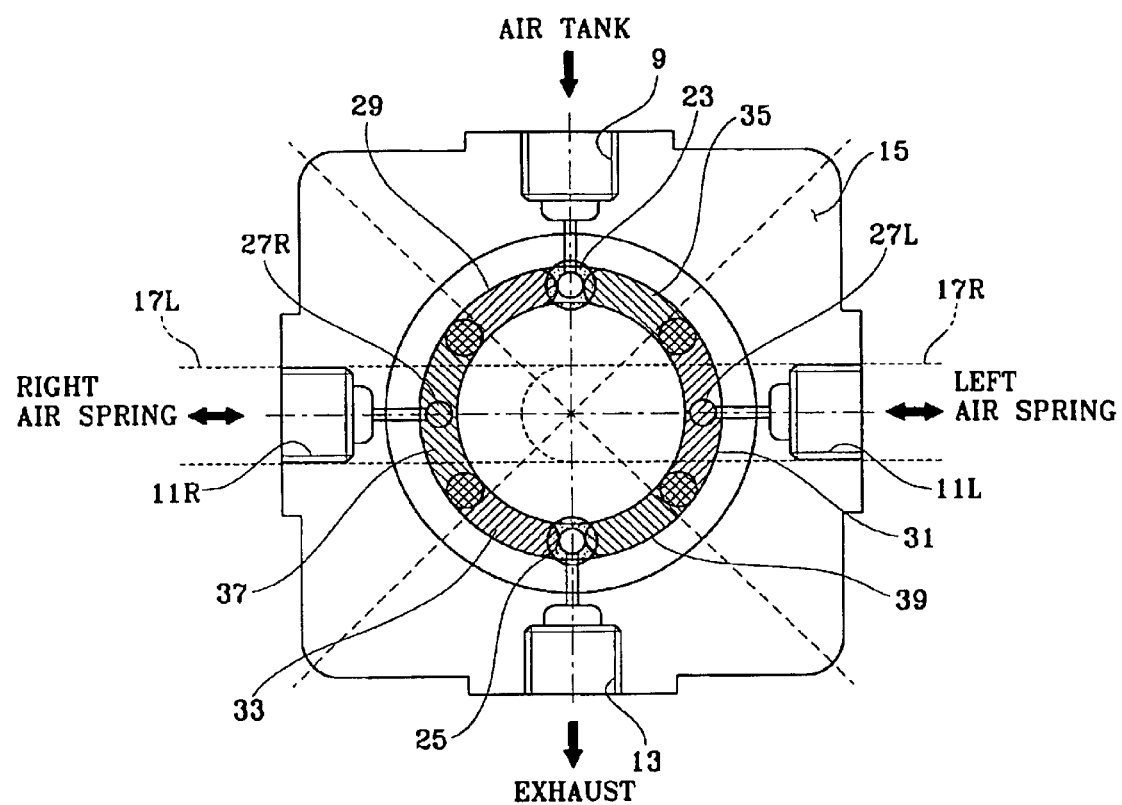

As shown in FIGS. 2 and 3, the roll sensing valve means 15 includes a valve body which defines an air inlet 9 connected to the air tank 1, left and right connecting holes 11L and 11R connected to the left and right air spring 3L and 3R, and an air outlet 13 exposed to the atmosphere and mounted on the vehicular body (B), left and right roll sensing levers 17L and 17R are installed at both sides of the valve body 15 to be respectively connected to the left and right roll sensing rods 5L and 5R. Left and right shafts 19L and 19R rotatably support the left and right roll sensing levers 17L and 17R on the valve body 15, and left and right rotors 21L and 21R are rotatably coupled to the left and right shafts 19L and 19R within the valve body 15 for switching the communicated states of the air inlet 9, the air outlet 13 and the left and right connecting holes 11L and 11R. The valve body further defines an air inlet hole 23 for supplying air from the air inlet 9 to the left and right rotors 21L and 21R, an air outlet hole 25 for discharging air from the left and right rotors 21L and 21R to the air outlet 13, and left and right passages 27L and 27R oppositely formed at right angles each from the air inlet hole 23 and the air outlet hole 25 to connect the left and right connecting holes 11L and 11R to the left and right rotors 21L and 21R.

The left and right rotors 21L and 21R are formed with three arched long holes respectively, each spaced apart preferably at 120 degrees. Air inlet hole 23, air outlet hole 25 and the left and right passages 27L and 27R are caused to communicate by overlapping the arched long holes in response to rotation of the left and right rotors 21L and 21R.

As shown in FIG. 3, one set of the three arched long holes, that is, a left rotor input hole 29, a left rotor operation hole 31 and a left rotor outlet hole 33 are formed on the left rotor 21L (in clockwise direction), while another set of the three arched long holes, that is, a right rotor input hole 35, a right rotor operational hole 37 and a right rotor outlet hole 39 are formed on the right rotor 21R (in counterclockwise direction). When the left and right roll sensing lever 17L and 17R are in a horizontal position, the arched long holes maintain the state as shown in FIG. 3.

The left and right passages 27L and 27R are provided with seal pipes 41 each closely attached to the left and right rotors 21L and 21R and springs 43 for providing resilience to the seal pipes 41. Leakage of air between the valve body 15 and the left and right rotors 21L and 21R is thereby prevented.

The roll sensing valve means, as shown in FIG. 7, is respectively mounted on the front axle 7F and the rear axle 7R via the roll sensing rods 5L and 5R. The roll sensing valve means is constructed to allow the compressed air to be provided from the air tank 1, such that front wheels and rear wheels are independently operated to obtain a more proper performance in the moving state of a vehicle. It should be apparent that the left and right roll sensing rods 5L and 5R can be connected respectively to the left and right wheels in a vehicle with an independent suspension system.

Hereinafter, the operation of the embodiments of present invention thus constructed will be described.

The left and right roll sensing levers 17L and 17R are rotated by the left and right roll sensing rods 5L and 5R transmitting vertical movement of the axle 7. As a result, the left and right rotors 21L and 21R are rotated within the valve body 15. Air is thus supplied into or discharged from the air springs 3L and 3R through air passages formed at the left and right rotors 21L and 21R and at the valve body 15, such that rolling control of the vehicle is automatically performed.

Under normal conditions, a state as shown in FIG. 3 is maintained in the valve 15. When the vehicle axles are raised, both wheels are raised to allow the left and right rotors 21L and 21R to rotate via the left and right roll sensing rods 5L and 5R and the left and right roll sensing levers 17L and 17R. The left side of the FIG. 4 depicts a state where the left and right roll sensing levers 17L and 17R are rotated at 10 degrees, while the right side of FIG. 4 depicts a state where the left and right roll sensing levers 17L and 17R are rotated at 20 degrees.

Figure 4A:
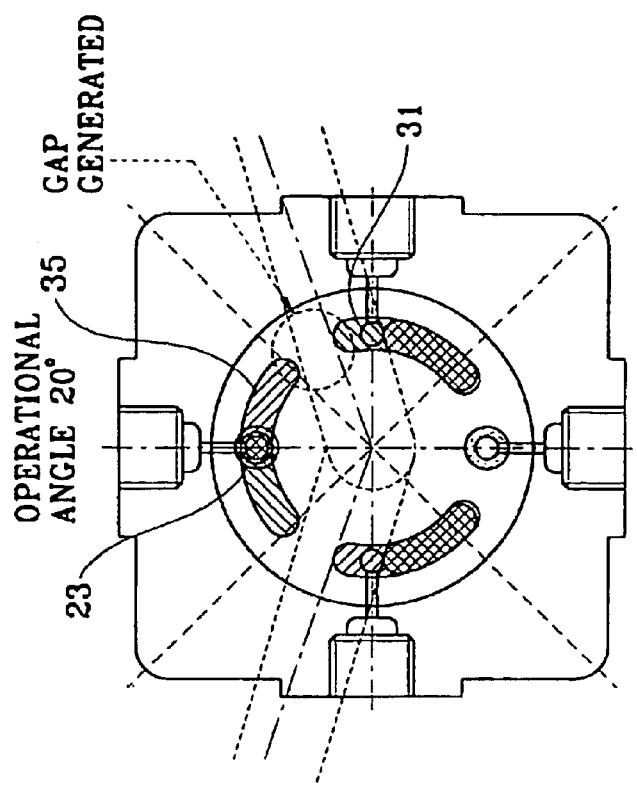
FIGS. 4A and 4B are schematic drawings explaining the operation of the roll sensing valve means when the vehicle axle is raised.
Figure 4B:
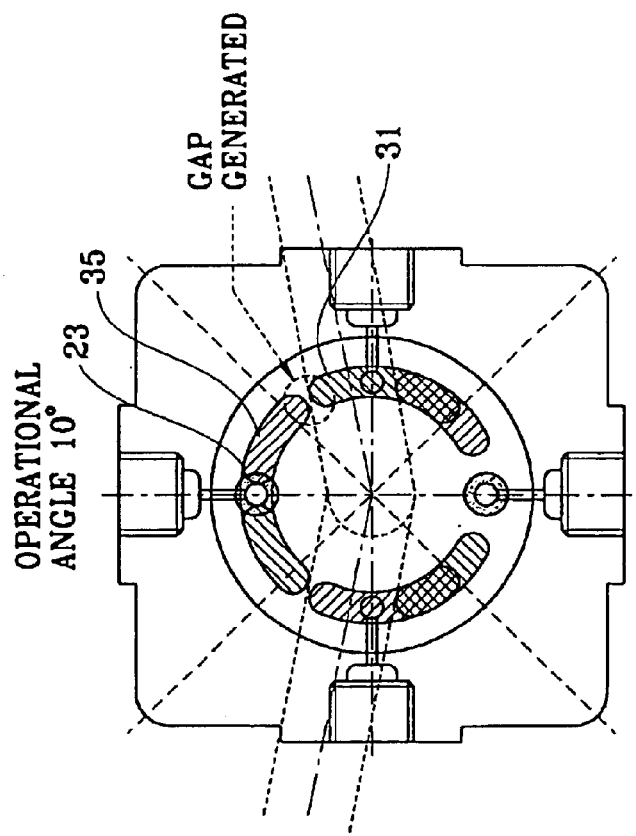

In FIG. 4, although the left and right rotors 21L and 21R are rotated to allow the left rotor input hole 29 and the right rotor input hole 35 to communicate with the air input hole 23, a gap is created between the right rotor input hole 35 and the left rotor operational hole 31, and between the left rotor input hole 29 and the right rotor operational hole 37. This gap results in no communication between the holes such that the air supplied from the air input hole 23 to the right rotor input hole 35 is not provided to the left passage 27L and the air supplied from the air input hole 23 to the left rotor input hole 29 is also not provided to the right passage 27R. In this condition there is no movement of air at the left and right air springs 3L and 3R, resulting in maintaining the current state.

Figure 5A:
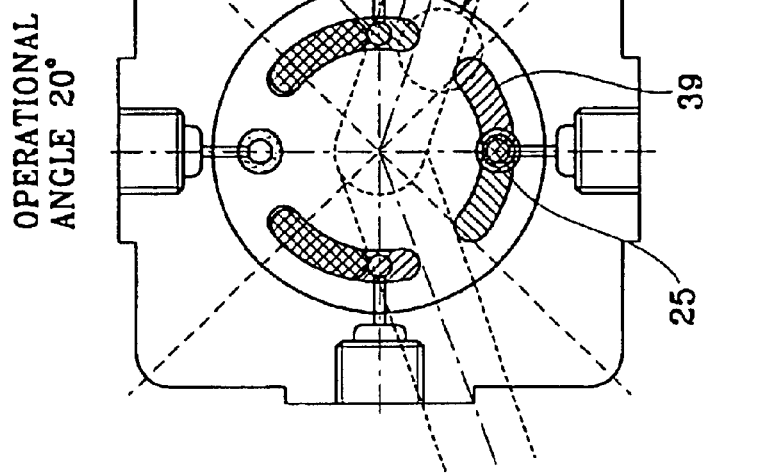
FIGS. 5A and 5B are schematic drawings explaining the operation of the roll sensing valve means when the vehicle axle is lowered.
Figure 5B:
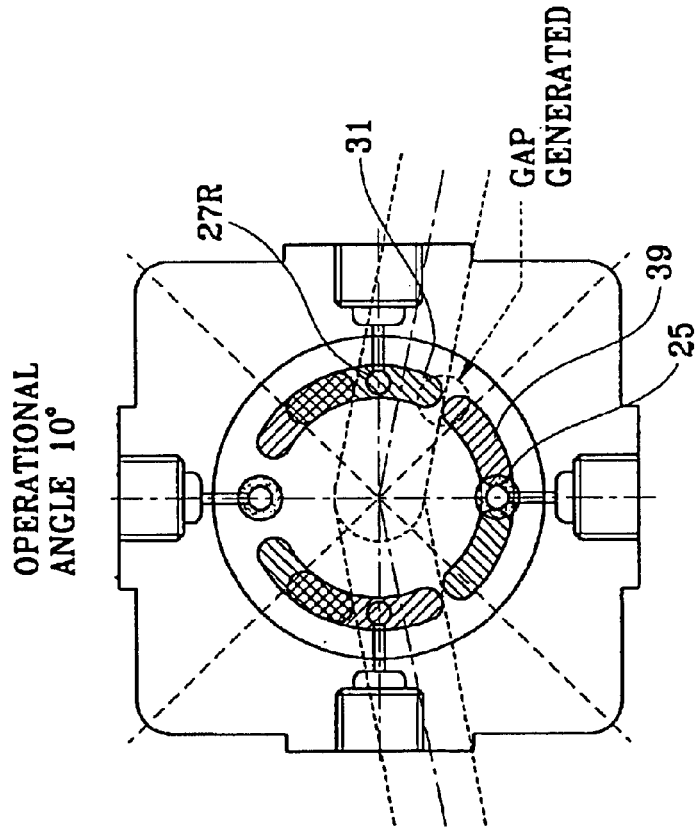

When the vehicle axles are lowered, the left and right roll sensing levers 17L and 17R are rotated downwards as shown in FIG. 5, to allow the left and right rotors 21L and 21R to rotate downwards. At this time, the air input hole 23 is blocked from the left rotor input hole 29 and the right rotor input hole 35, preventing the air from being supplied. Although the left rotor outlet hole 33 and the right rotor outlet hole 39 communicate with the air outlet hole 25, a gap is formed between the right rotor outlet hole 39 and the left rotor operational hole 31, preventing communication therebetween. Another gap is also formed between the left rotor outlet hole 33 and the right rotor operational hole 37, also preventing communication therebetween. The left passage 27L and the right passage 27R, which communicates with the left and right air springs 3L and 3R, are thus prevented from communicating with the air outlet hole 25, thereby leaving the air in the left and right air springs 3L and 3R to stay motionless.

Figure 6:
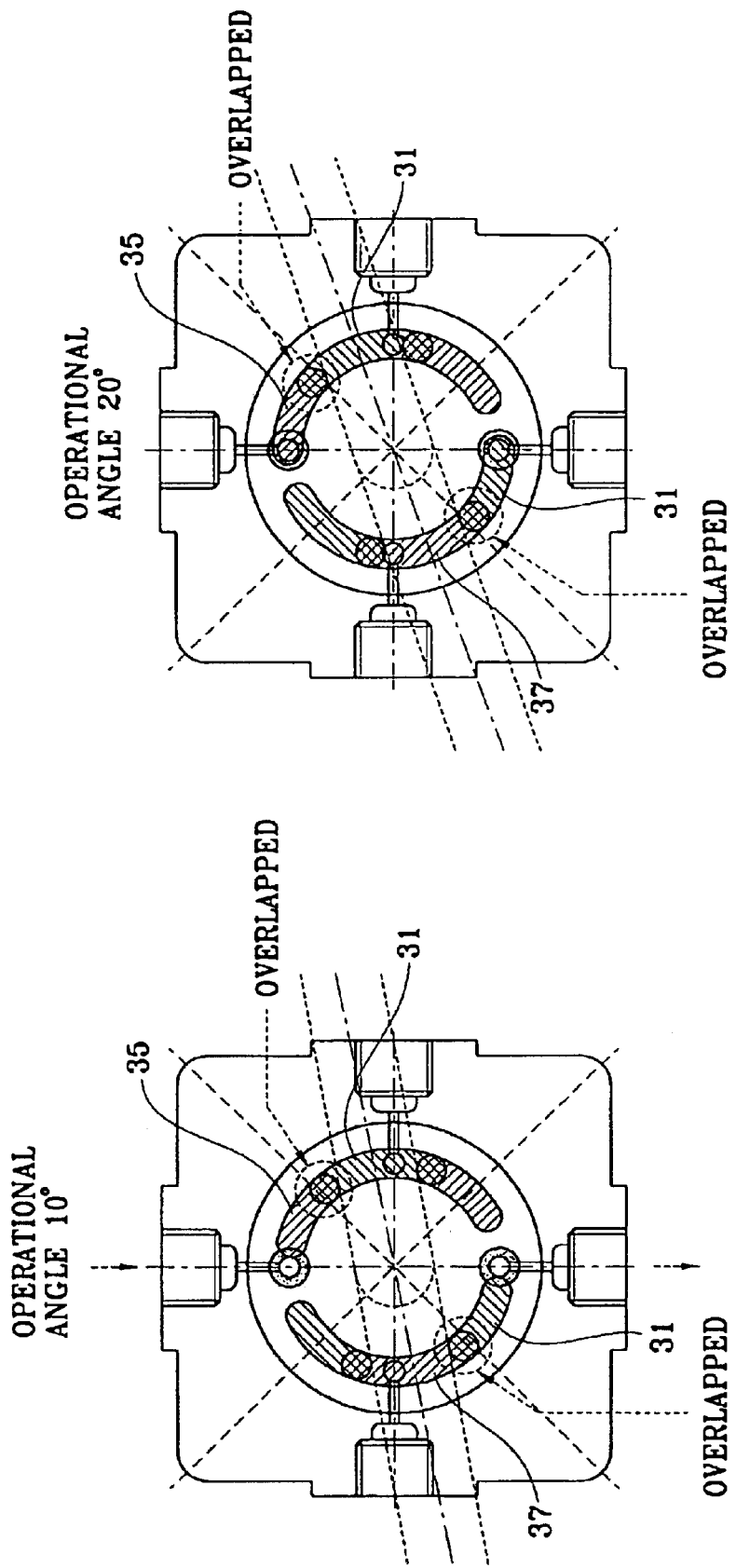
FIGS. 6A and 6B are schematic drawings explaining the operation of the roll sensing valve means when the vehicle rolls.

As depicted in FIGS. 6A and 6B, when a vehicle rolls, the left roll sensing lever 17L is rotated, for example, at 10 degrees and 20 degrees downwards, respectively. At the same time, the right roll sensing lever 17R is rotated at 10 degrees and 20 degrees upwards, respectively. The left rotor operational hole 31 communicates with the right rotor input hole 35 and the right rotor input hole 35 communicates with the air input hole 23 in response to the rise of the right roll sensing lever 17R and descent of the left roll sensing lever 17L, whereby the air input to the air input hole 23 is supplied to the left air spring 3L through the right rotor input hole 35, the left rotor operational hole 31 and the left passage 27L. Similarly, the right rotor operational hole 37 communicates with the left rotor outlet hole 33 and the left rotor outlet hole 33 communicates with the air outlet hole 25, such that the air in the right air spring 3R is discharged to the atmosphere through the right rotor operational hole 37, the left rotor outlet hole 33 and the air outlet hole 25. As a result, air is discharged at the right air spring 3R where the wheels rise while the air is supplied to the left air spring 3L where the wheels descend, thereby controlling the rolling.

When rolling occurs in the opposite direction, action opposite from the aforesaid will limit the rolling. The rotated state of 10 degrees and 20 degrees of the left and right roll sensing levers 17L and 17R control the size of the opening between the operation hole and outlet hole, and between the operational hole and the input hole, such that a larger rotated state creates a larger air passage, thereby enabling rolling control with faster air flow.

As apparent from the foregoing, there is an advantage in the vehicular roll stabilizer thus described according to the present invention, in that, without using a leveling valve, air in the left and right air springs can be directly controlled such that a desired roll resistance can be actively obtained without changing the diameter of the stabilizer to improve the rolling.

The foregoing descriptions of specific embodiments of the present invention are presented for purposes of illustration and description. They are not intended to be exhaustive or to limit the invention to the precise forms disclosed. Obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A vehicular roll stabilizer for a vehicle with air spring suspension between the axles and body, comprising:

a roll sensing valve configured and dimensioned to be traversely and centrally mounted on the vehicular body, said valve receiving compressed air from an air tank to adjust a level of compressed air respectively supplied to left and right air springs; and left and right roll sensing rods operatively connecting said roll sensing valve and axles;

wherein said roll sensing valve includes a valve body defining an inlet for connection to the air tank;

left and right connecting holes connected to the left and right air sprints and an air outlet exposed to the atmosphere;

left and right roll sensing levers connected to the left and right roll sensing rods;

left and right shafts rotatably supporting the left and right roll sensing levers on the valve body;

left and right rotors rotatably coupled to the left and right shafts within said valve body for switching a communicated state of the air inlet, the air outlet and the left and right connecting holes, and wherein said valve body includes:

an air inlet hole for supplying air from said air inlet to the left and right rotors;

an air outlet hole for discharging air from said left and right rotors to said air outlet; and left and right passages connecting said left and right connecting holes to the left and right rotors oppositely formed at right angles each from the air inlet hole and the air outlet hole and wherein the left and right rotors are formed with three arched holes, each spaced apart at about 120 degrees, such that said air inlet hole, said air outlet hole and left and right operational holes are switched in communicated states thereof by overlapping of arched long holes in response to rotation of said left and right rotors.

2. The stabilizer as defined in claim 1, wherein the left and right passages comprise:

seal pipes each attached to said left and right rotors; and
springs for providing resilience to the seal pipes.

* * * * *